United States Patent
Wang et al.

[19]

[11] Patent Number: 6,089,643
[45] Date of Patent: Jul. 18, 2000

[54] GLARE SHIELDING AND LIGHT POLARIZING VISOR

[76] Inventors: Chia-Hung Wang; Chia-Zheng Wang, both of P.O. Box 82-144, Taipei, Taiwan

[21] Appl. No.: 09/236,595

[22] Filed: Jan. 26, 1999

[51] Int. Cl.⁷ ......................................................... B60J 3/02
[52] U.S. Cl. ............................................................. 296/97.2
[58] Field of Search ............................................. 296/97.2

[56] References Cited

U.S. PATENT DOCUMENTS

| | | | |
|---|---|---|---|
| 2,311,840 | 2/1943 | Land | 296/97.2 |
| 2,458,125 | 1/1949 | Winkler | 296/97.2 |
| 2,526,889 | 10/1950 | McComb | 296/97.2 |
| 2,528,038 | 10/1950 | Crise | 296/97.6 |
| 2,856,810 | 10/1958 | Frost | 296/97.2 |
| 2,915,936 | 12/1959 | Winchell | 296/97.2 |
| 2,915,937 | 12/1959 | Winchell | 296/97.2 |

*Primary Examiner*—Gary C. Hoge
*Attorney, Agent, or Firm*—A & J

[57] ABSTRACT

A glare shielding and light polarizing visor comprising a board body having an upper portion and a lower portion, being provided with a viewing window thereon, said upper portion of the board body being pivotally secured adjacent to the rearview mirror of a vehicle. An adjustable disc having a hollow body frame rotatably secured to said board body, a first lens being mounted to said body frame and corresponding to the viewing window and a second lens being mounted to one lateral side of the board body and covered the viewing window and corresponding to said first lens. Thereby rotating the adjustable disc causes a variation of the polarized angle formed by the first and second lens and thus change the light transmittancy of the first and the second lens.

1 Claim, 12 Drawing Sheets

1

GLARE SHIELDING AND LIGHT POLARIZING VISOR

BACKGROUND OF THE INVENTION (a) Field of the Invention

The present invention relates to a glare shielding and light polarizing visor and more particularly to such a shielding and polarizing visor which is pivotally mounted adjacent to a rearview mirror of the vehicle, or clip onto the flip-down visor of the vehicle.

(b) Description of the Prior Art

In the automobile industries, breakthrough improvements have been made with respect to mechanical performances of the vehicles, for instance, the power output of engine torque performance, etc, and to other safety features, such as, the safety belts, the bumpers, the airbags, etc. However, when a driver faces strong or very bright glare while driving, frequent accidents may be occurred for the reason that the strong glare may blur the driving direction of the driver to drive in the correct lane on the road. Normally, a flip-down sun visor is pivotally secured adjacent to the rearview mirror of the vehicle, at a position closed to the forehead of the driver. When the strong sunlight or glare comes down directly via the windshield to the driver, the flip-down sun visor is flipped down to block or shield the direct sunlight. However, the conventional sun visor used in the vehicle is merely a flat board having a rigid and opaque planar body and only a very small area of the board is used to block the sunlight. This prior sun visor does not fully provide the needs of the driver. In this respect, the present invented glare shielding and light polarizing visor substantially depart from the concepts, structures of the prior art. This invention provides the driver to shield the glare from the strong light and at the same time, allows the driver to clearly see the road condition in front of him.

SUMMARY OF THE PRESENT INVENTION

Accordingly, in view of the foregoing disadvantages inherent in the flip-down sun visor now present in the prior art, the present invention provides a glare shielding and light polarizing visor for the reducing the glare from the light.

It is another object of the present invention to provide a glare shielding and polarizing visor, which can be used to replace the prior sun visor without major modification of the parts secured the visor, the glare shielding and light polarizing board comprises comprises a board body 1 having an upper portion and a lower portion, being provided with a viewing window 11 on the body 1, and adjustable disc 2 rotatably mounted to a first lateral side of the board body 1, a first lens 20 being mounted onto the adjustable disc 2, and the first lens 20 covered the viewing window 11 of the board body 1, and a second lens 3 being mounted to the first lateral side of the board body 1, and corresponding to the first lens 20 of the adjustable disc 2. Thus, rotating the adjustable disc 2 changes the corresponding angle of the first and second lenses 20,3. The light transmittancy of the lenses 20,3 combination is thereby varied so that light of different intensity is shielded or polarized.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

The invention will be better understood, and the objects and advantages other than those set forth above will become apparent when consideration is given to the following detailed description thereof. The following description makes reference to the annexed drawings wherein.

DETAILED DESCRIPTION OF THE PREFERRED EMBODIMENT

Figure 1:
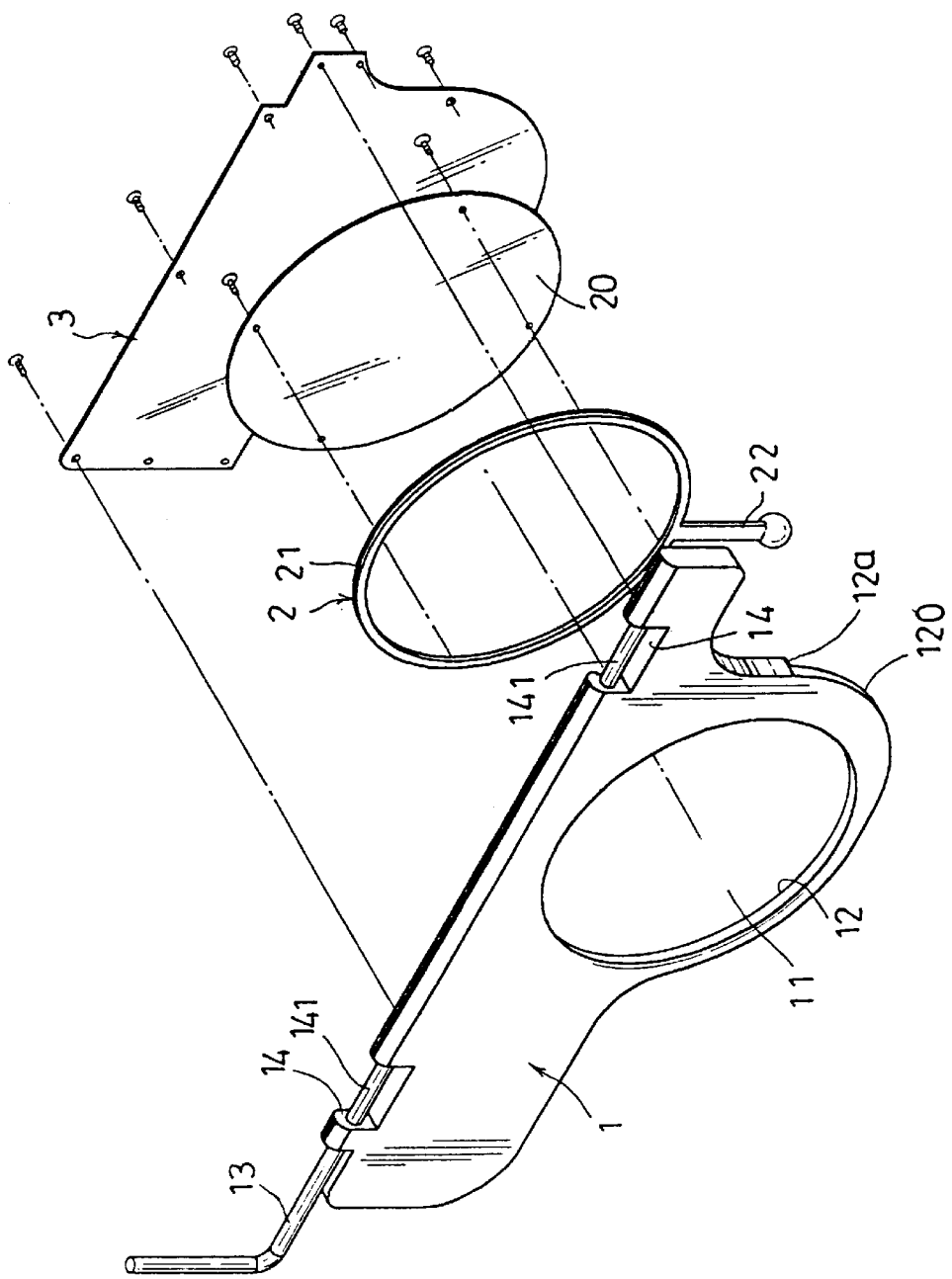
FIG. 1 is an exploded perspective view of the glare shielding and light polarizing visor in accordance with the present invention.
Figure 2:
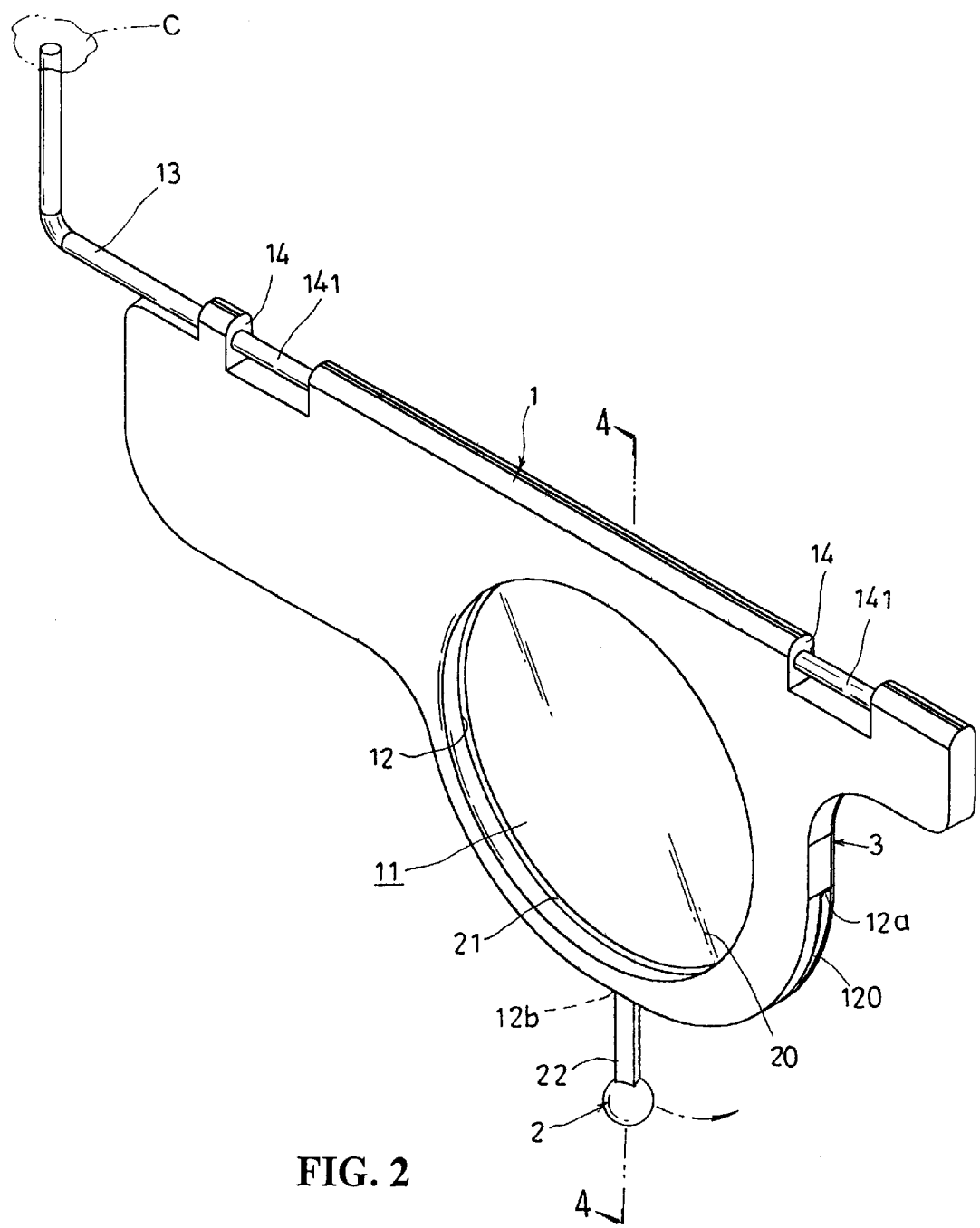
FIG. 2 is a perspective view of the present invention.

With reference now to the drawings and in particular to FIGS. 1 to 4, the glare shielding and light polarizing visor of the present invention is depicted. In accordance with the present invention, the visor comprises a board body 1 having an upper portion and a lower portion, being provided with a viewing window 11 on the body 1, and adjustable disc 2 rotatably mounted to a first lateral side of the board body 1, a first lens 20 being mounted onto the adjustable disc 2, and the first lens 20 covered the viewing window 11 of the board body 1, and corresponding to the first lens 20 of the adjustable disc 2. Thus, rotating the adjustable disc 2 changes the corresponding angle of the first and second lenses 20,3. The light transmittancy of the lenses 20,3 combination is thereby varied so that light of different intensity is shielded or polarized. Accordingly, the present invention provides the driver an undisturbed driving environment.

Figure 7:
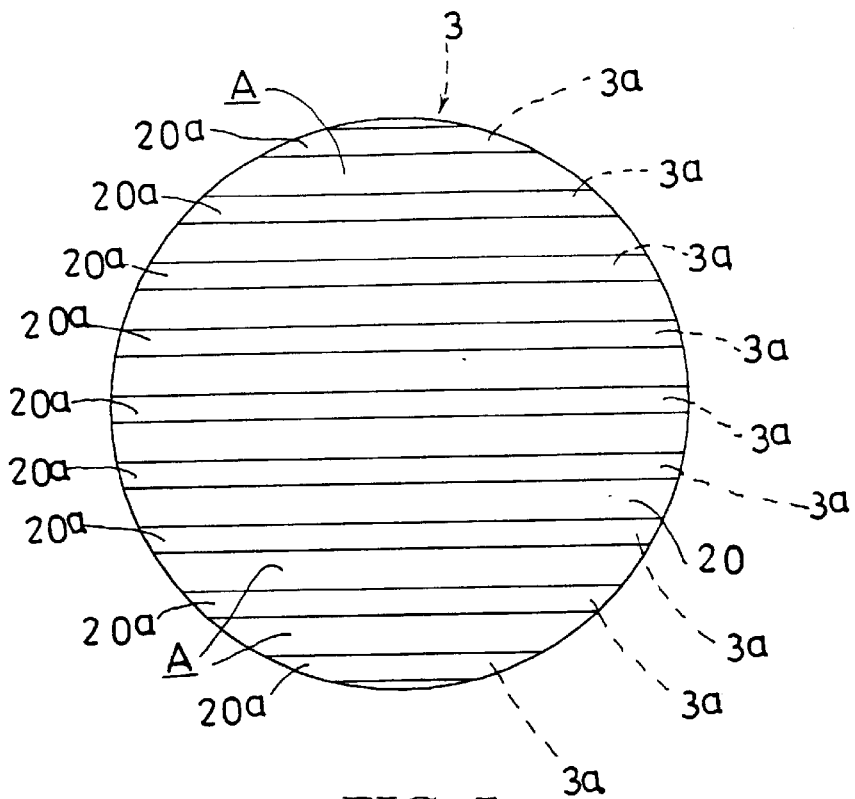
FIG. 7 shows the position of the first lens and the second lens which provide the largest light transitivity.
Figure 8:
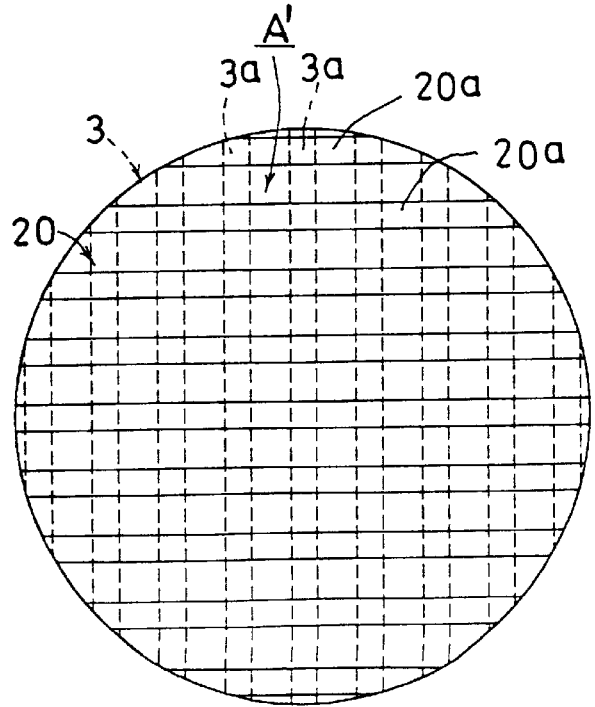
FIG. 8 shows the state of the first len and the second len which provides the lowest light transmittancy.
Figure 9:
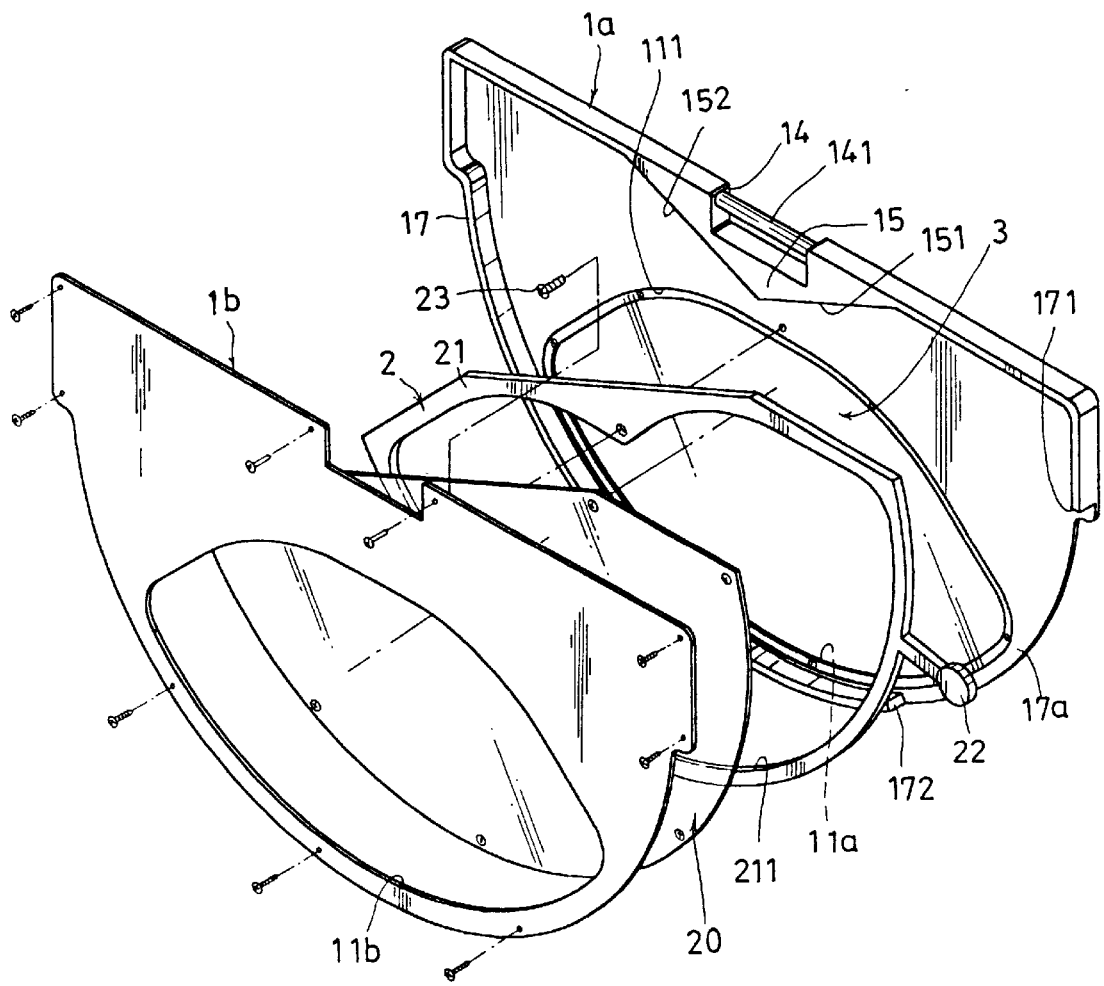
FIG. 9 is an exploded perspective view of a third preferred embodiment in accordance with the present invention.
Figure 10:
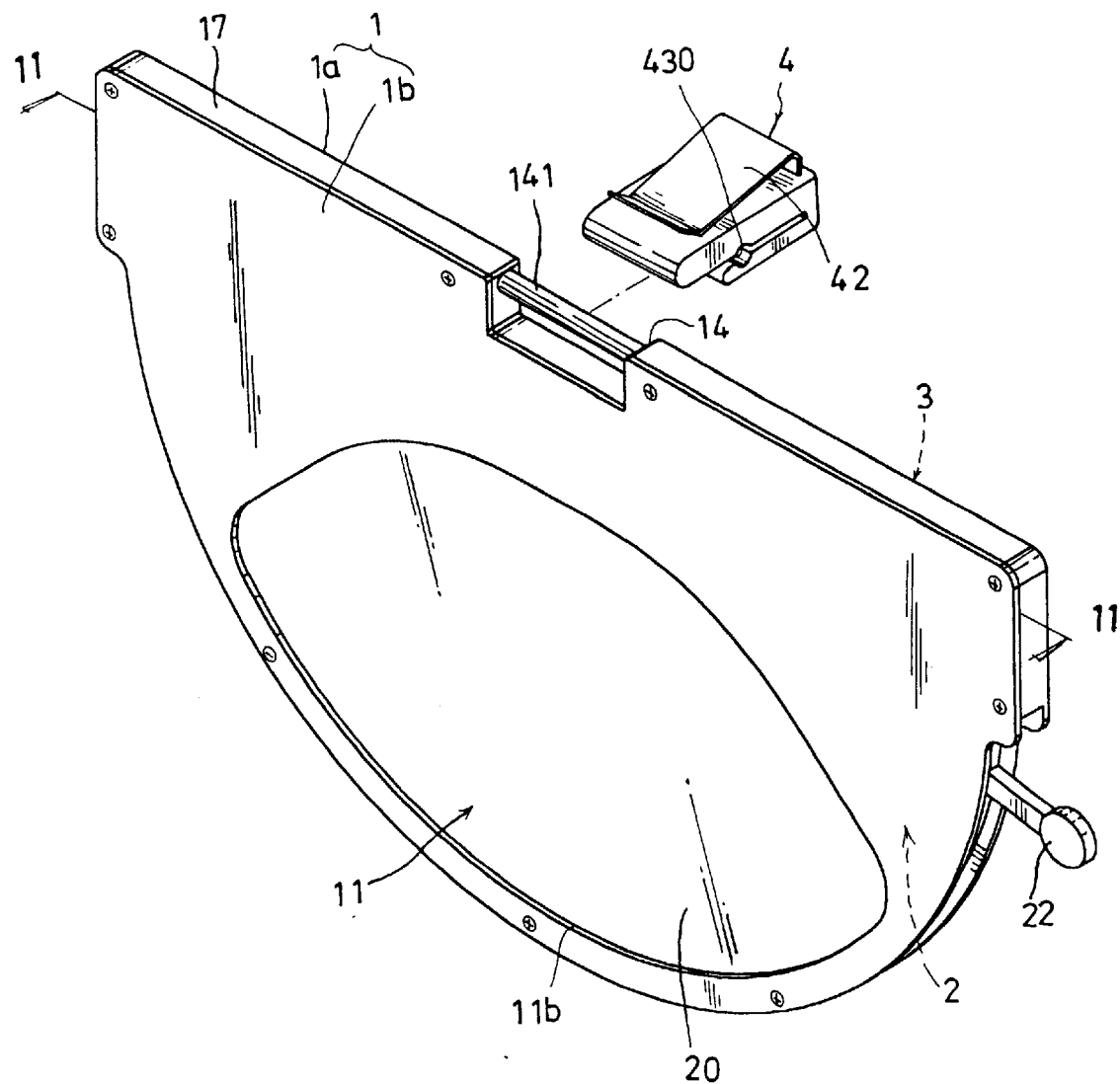
FIG. 10 is a perspective view of the third preferred embodiment in accordance with the present invention.
Figure 11:
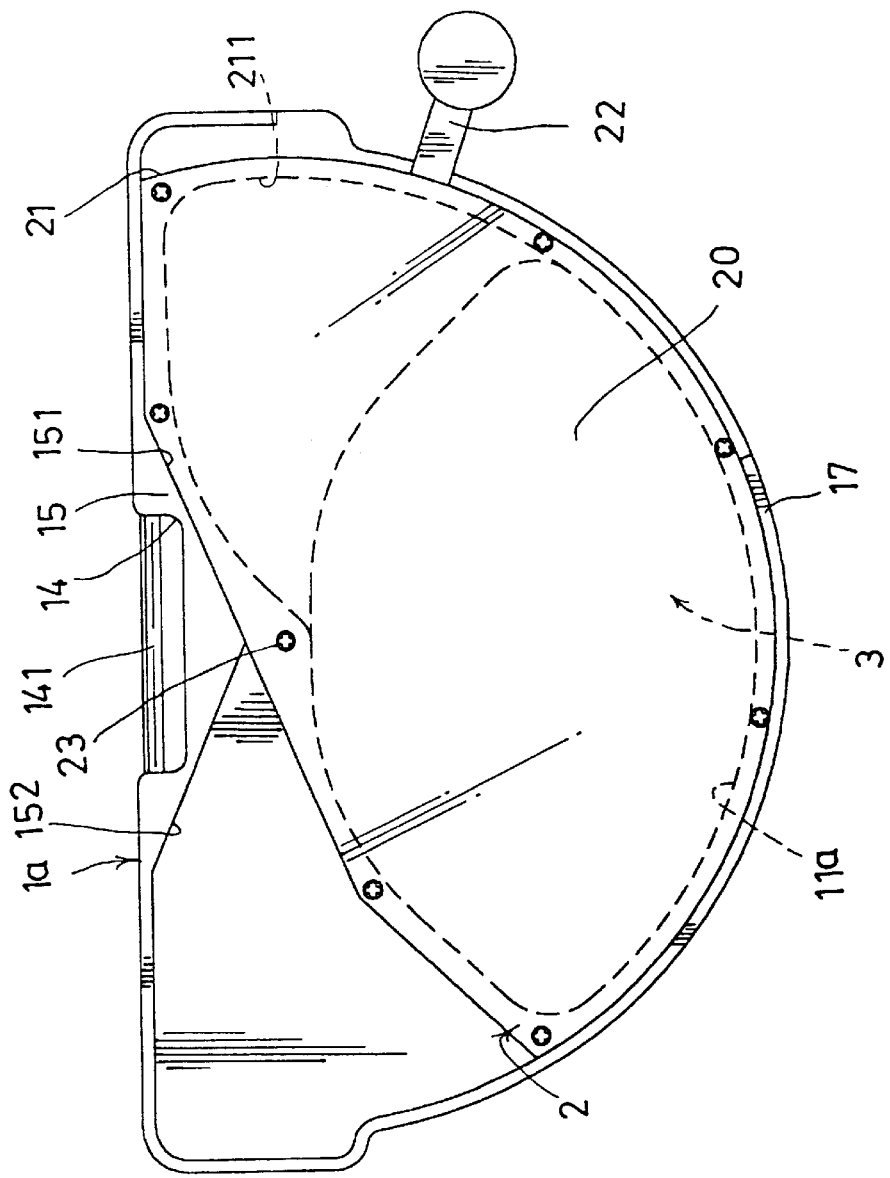
FIG. 11 is sectional view taken along line 11—11 of FIG. 10.
Figure 12:
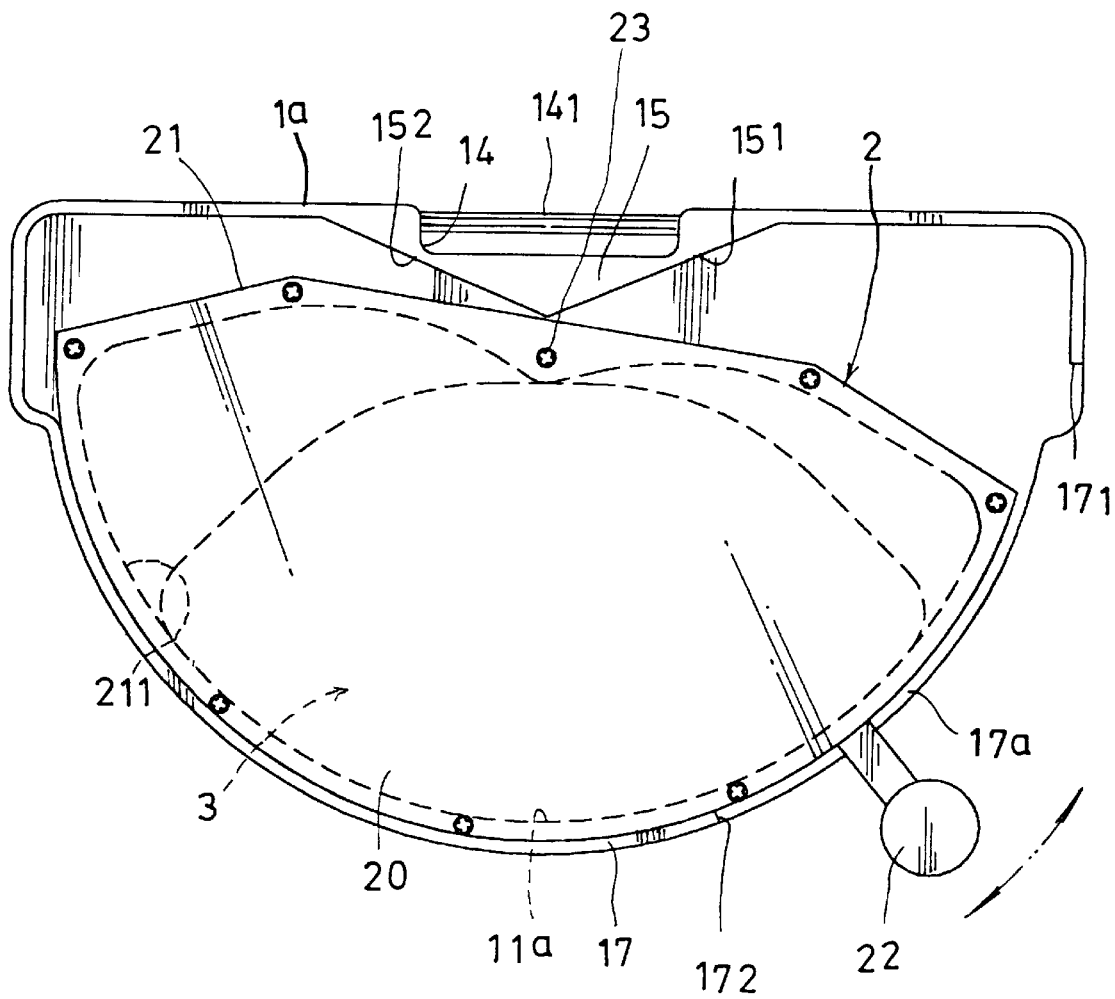
FIG. 12 is a schematic view showing the adjustment of the adjustable disc from the position as shown in FIG. 11.

Referring to FIGS. 7 and 8, the first and second lens 20,3 are conventional type of polarized lens, having a plurality of parallel light rates 20a, 3a. When the light grates 20a, 3a of the first and the second lens are superimposed on each other (as shown in FIG. 7), the transmittancy area A thus formed by any two adjacent light grates 20a, 3a is the largest. Thus, at this instance, the light transmittancy rate is excellent which is used to shield the weakest light intensity. When the light grates 20a, 3a; of the first and second lens 20a, 3a are perpendicular to each other (as shown in FIG. 8), the transmittancy area A thus formed by the first and second lens 20,3 is the smallest, which is suitable for shielding or polarizing strong light intensity. Thus, by adjusting the angle formed by the first and the second lenses 20,3 via rotating the lenses 20,3 the degree fo transmittancy of the lenses 20,3 can be obtained.

Again, referring to FIG. 1 to 4, the board body 1 is formed from two housing made by plastic moulding or may be formed by other method. The board body 12 comprises a viewing window 11, a ring slot 12 being formed around the circumference of the viewing window 11 to hold the adjustable disc 2, which is rotatable within the ring slot 12; at least one connection bar 13 pivotally mounted to the upper portion of the board body 1; and one free end 13a of the connection bar 13 being mounted adjacent to the rearview mirror (not shown), such that the board body 1 can be flip-down about the axis of the connection bar 13.

In accordance with the present invention, the adjustable disc 2 comprises a hollow body frame 21 which can be mounted to the right slot 12 and rotatably within the ring slot 12; an actuating bar 22 joined to the outer circumference of the hollow body frame 21 and protruded out form the board body 1 when mounted to the slot 12, said bar 22 being used to rotatably move the adjustable disc 2; and a first lens 20 mounted to the edge of the hollow body frame 21 and corresponding to the viewing window 11.

Figure 3:
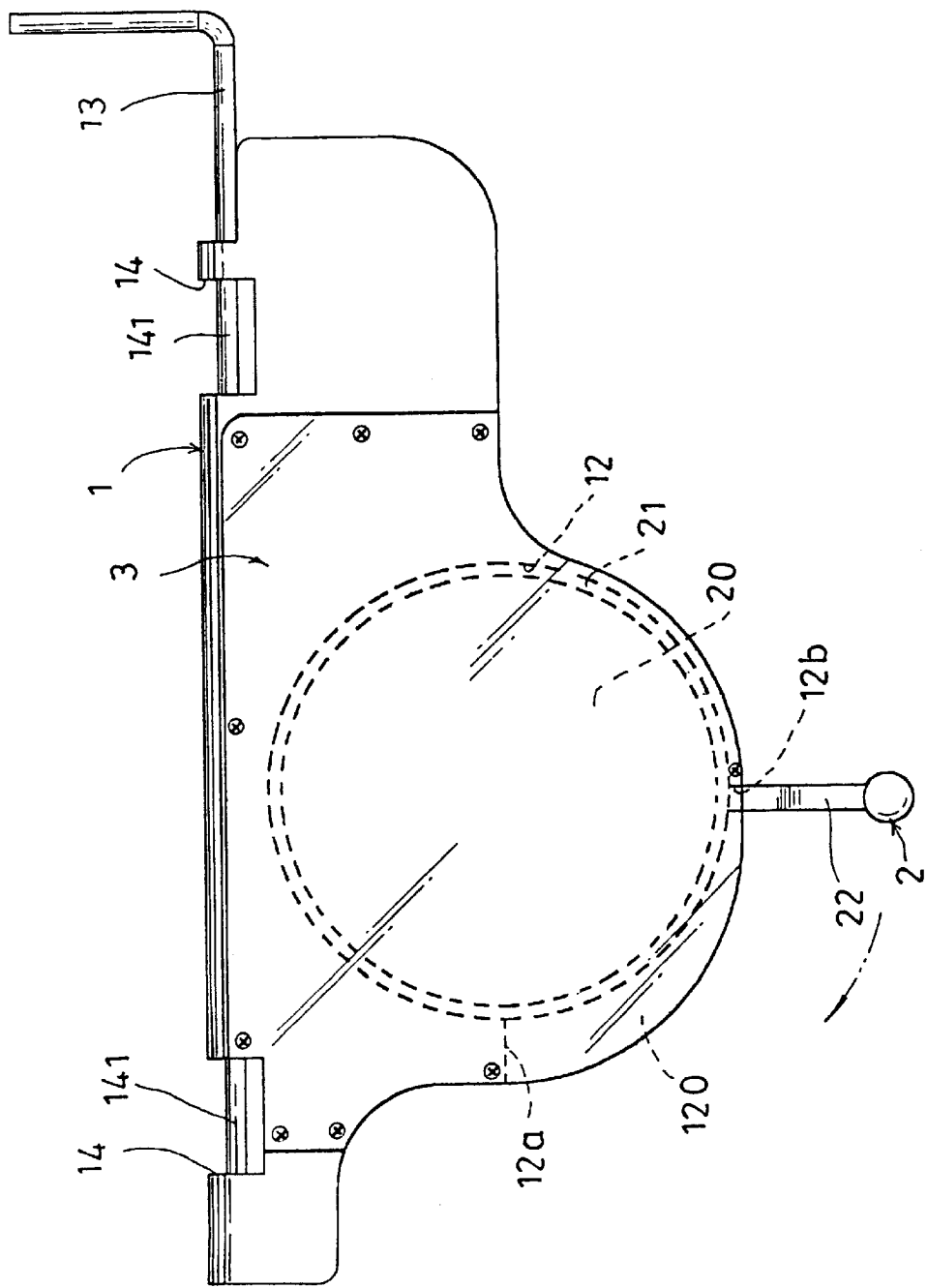
FIG. 3 is a rear elevational view of the present invention.
Figure 4:
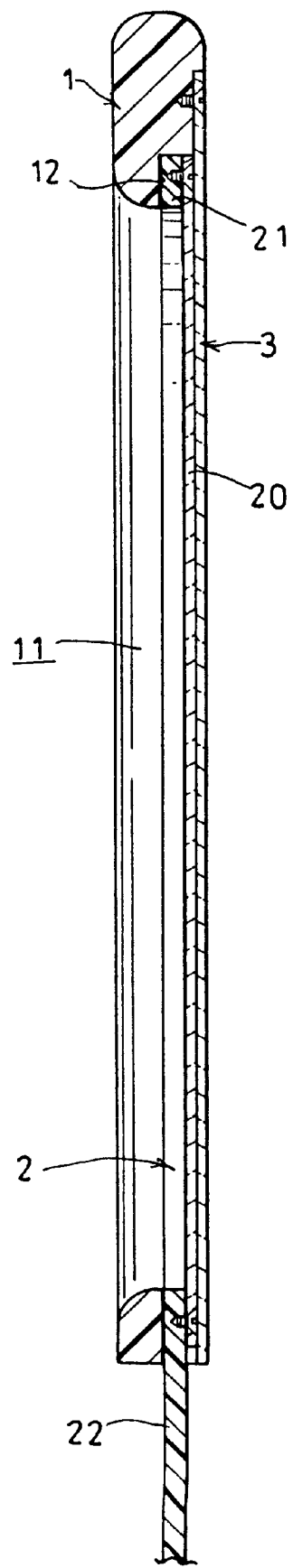
FIG. 4 is sectional view taken along line 4—4 of FIG. 2.

As shown in FIG. 3, a stopping recess 120 is provided to the ring slot 12, and a pair of stopping arms 12a, 12b are provided to the ends of the recess 120 such that the actuating bar 22 of the adjustable disc 2 is rotatably restricted within the recess 120, and is blocked by the stopping arms 12a, 12b. The angle of rotation of the adjustable disc 2 is about 90°, which is also the angle of rotation for the first lens 20.

Referring again to FIGS. 1 to 4, when installation, the first lens 20 is mounted to the circumferential edge of the hollow body frame 21 of the adjustable disc 2 and then the hollow body frame 21 of the adjustable disc 2 is mounted to the ring slot 12. The actuating bar 22 is mounted within the recess 120 and protruded out from the board body 1. After that, the second lens 3 is mounted to onto the first lens 20 at the first lateral side of the board body 1, i.e., the outer lateral edge of the adjustable disc 2 such that the second lens 3 and the board body 1 enclose the hollow body frame 1 and the first lens 20 to be within the ring slot 12 and rotatably moved within the slot 12, Thus, the driver actuates the actuating bar 22 which urges the first lens 20 to rotate. That is, the corresponding angle of the first and the second lenses 20,3 can be varied, which in turn, change the light transmittancy of the first and second lenses 20,3 to suit the driver in shielding the light from directly contact with the driver eyes.

Figure 5:
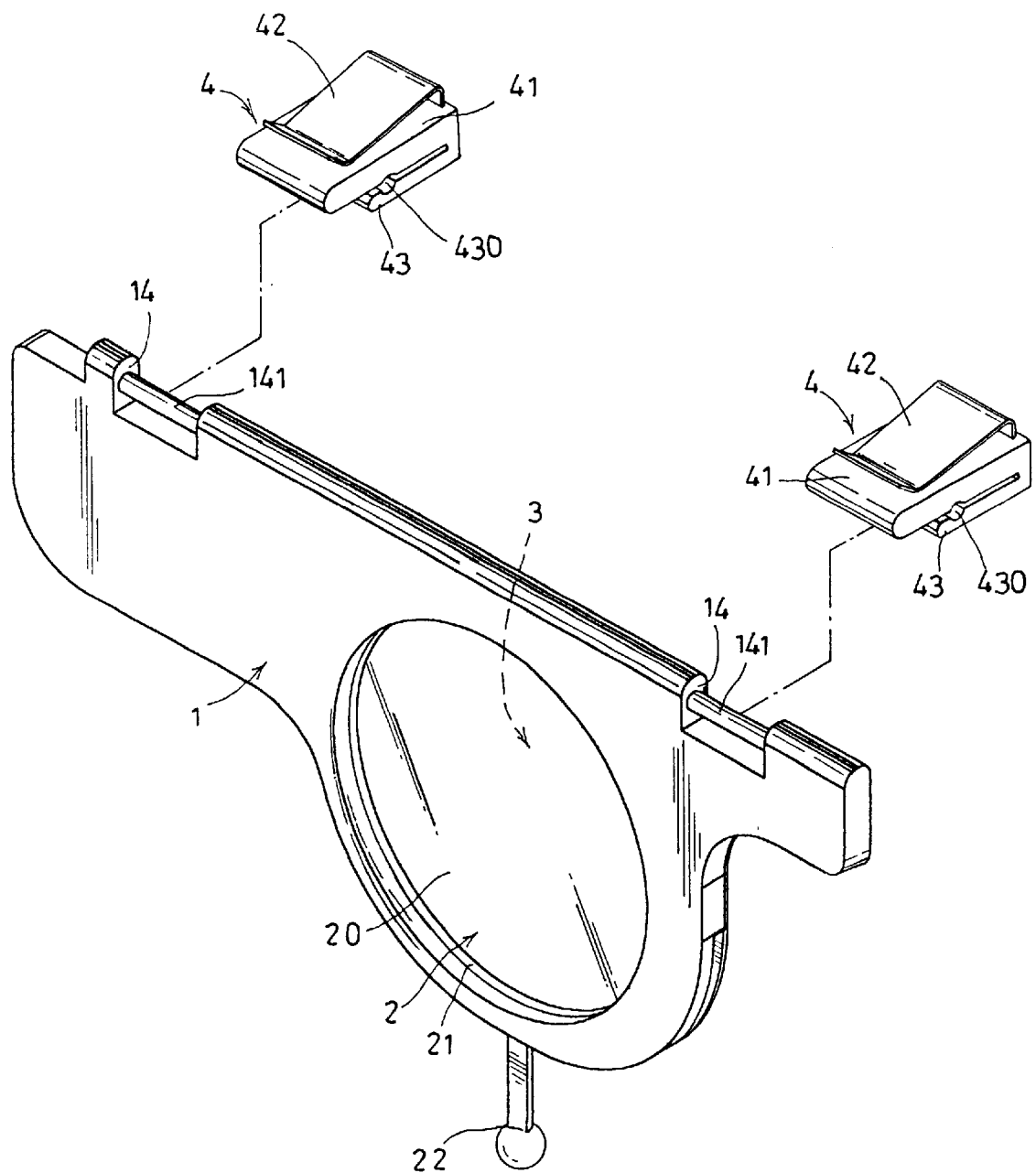
FIG. 5 is an exploded perspective view of another preferred embodiment in accordance with the present invention.
Figure 6:
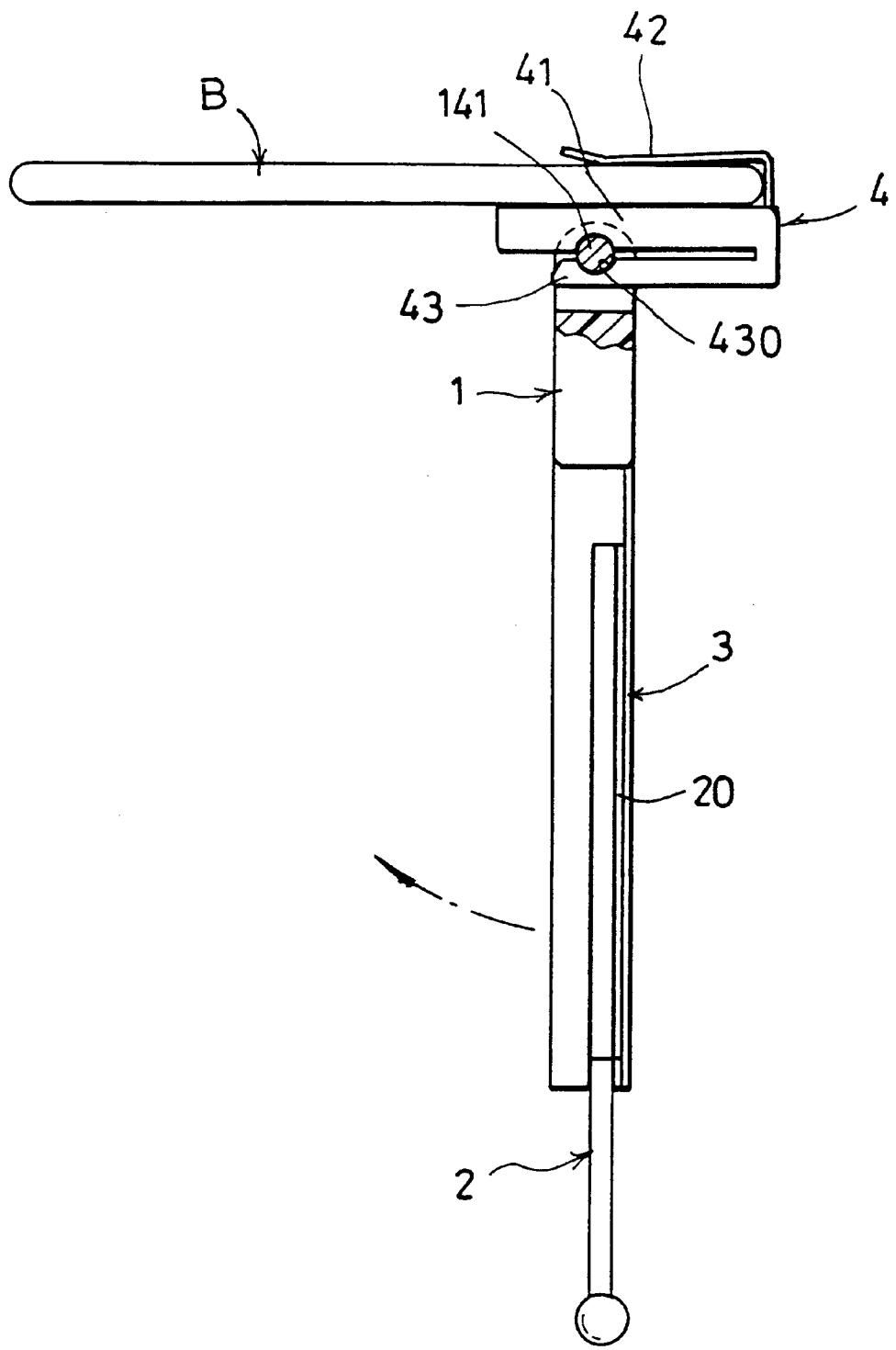
FIG. 6 is a side elevational view, indicating the operation of the present invention.

As shown in FIG. 5 and FIG. 6, there is shown another preferred embodiment of the present invention, wherein at the ends of the upper section of the board body 1, a notch 14 having a horizontal rod 141 is each provided. In accordance with the present invention, at least two fastening means 4 are provided to the notch 14 to fasten the shielding and polarizing visor to the existing sun visor B of the vehicle, without replacing the sun visor B. The fastening means 4 comprises a body 41 having a clip 42 for clipping onto the sun visor B. At the bottom face of the fastening device, an elastic clipping arm 43 is provided and a gap 430 is formed between the clipping arm 43 and the body 41, such that the gap 430 can be inserted into the horizontal rod 141 at the notch 14. Thus, the fastening means 4 mounts the shielding and polarising visor onto the sun visor.

Referring to FIGS. 9 to 12, which is another preferred embodiment in accordance with the present invention, wherein the present shielding and polarizing visor can be modified to comprise a board body 1, an adjustable disc 2 pivotally mounted onto the board body 1 by means of a peg 23; a first lens 20 being mounted onto the adjustable disc 2; and a second lens 20, thereby, the actuating of the adjustable and corresponding to the area of the first lens 20, thereby, the actuating of the adjustable disc 2 about the peg 23 as the centre of rotation will simultaneously adjust the angle formed by the light grates of the first and the second lens 20,3 so as to change the light transmittancy of the first and the second lens 20,3 combination and to shield and polarize the incoming light.

In accordance with the present invention, the board body 1 comprises a base 1a having an opening 11a. A recess 111 is formed at the circumferential of the opening 11a for the mounting of the second lens 3. At the circumferential edge of the base 1a, a side protruded edge 17 having a cut opening 17a is provided, and the ends of the cut opening 17a is each provided with a blocking arms 171, 172 such that the actuating bar 22 protruded out of the external edge of the adjustable disc 2 can be retained and slided along the cut opening 17a. The actuating bar 22 is blocked by two blocking arms 171, 172 which defines the range of rotation of the adjustable disc 2. A viewing hole 11b corresponding to the opening 11a, of an external cap 1b forms a viewing window 11. The external cap 1b is mounted to the outside of the base 1a.

The adjustable disc 2 comprises a hollow board body 21 having a fan-like opening 211. The centre of the top end of the board body 21 is pivotally mounted to the base 1a of the body 1 by means of a peg 23. The external lateral side of the hollow board body 21 is mounted with a first lens 20, which fully covers the fan-like opening 211. An actuating bar 22 is mounted at the external edge of the hollow board body 21. The actuating bar 22 is protruded out via the opening 17a of the board body 1, such that the driver can adjust the adjustable disc 2 by actuating the bar 22.

In accordance with the present invention, a V-shaped seat 15 is provided to the base 1a of the board body 1. The slant faces 151, 152 at the sides of the V-shaped seat 15 are used to restrict the range of rotation of the adjustable disc 2.

Figure 13:
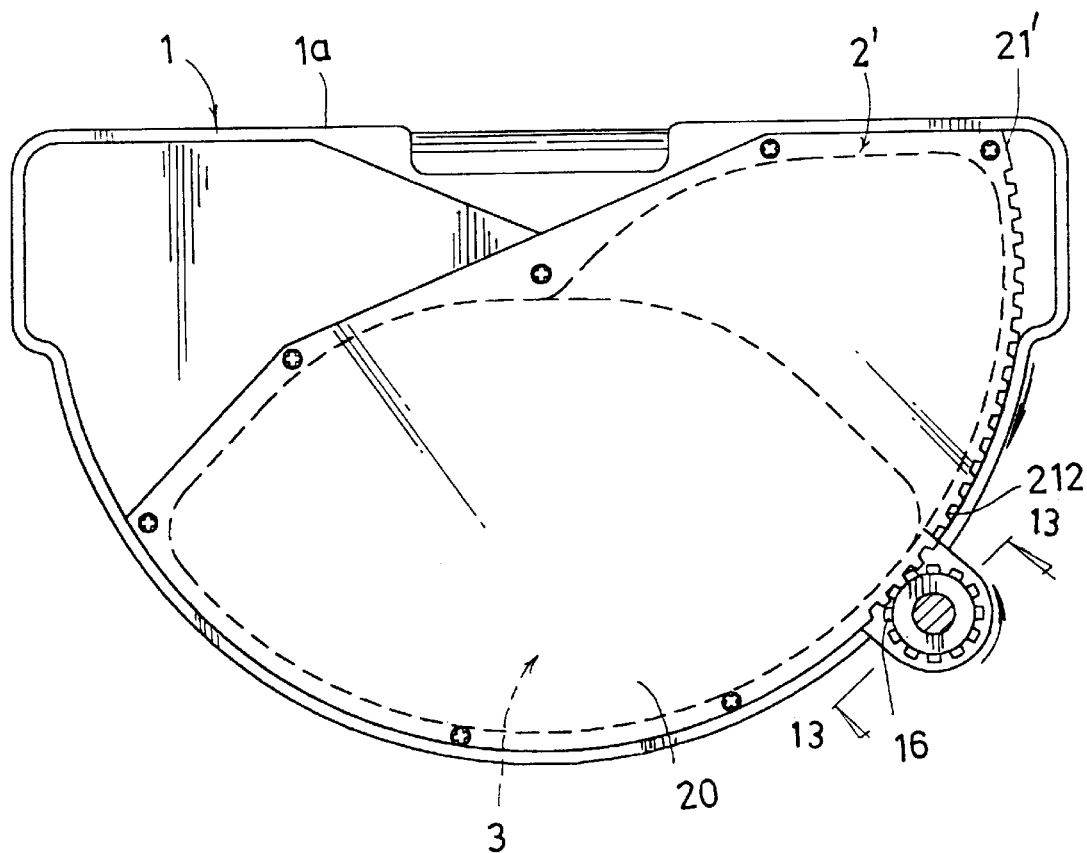
FIG. 13 is a forth preferred embodiment in accordance with the present invention.
Figure 14:
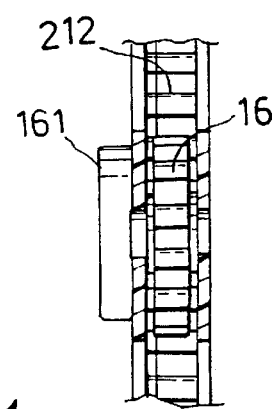
FIG. 14 is section view taken along line 13—13 of FIG. 13.

As shown in FIGS. 13 & 14 there is shown another preferred embodiment of the present invention, wherein, the edge of the hollow board body 21 on the adjustable disc 2 is provided with a teeth-like member 212 and the teeth-like member 212 is in engagement with an adjustable gear wheel 16 mounted at the external edge of the board body 21, such that the driver can adjust a rotating knob 161 mounted on the adjustable gear wheel 16 to adjust the adjustable disc 2 in order to adjust the corresponding angle formed by the first and the second lens 20,3 in shielding and polarizing the incoming light.

As shown in FIGS. 9 to 13, a peg 23 is mounted to the board body 1. The viewing window 11 formed on the board body 1 is rotatably about the peg 23 to provide a wider viewing region. Thus, it allows the driver to have a clearer view on the road condition.

Having described our invention insufficient detail to enable those skilled in the art to make and use it,

I claim:

1. A glare shielding and light polarizing visor comprising
   (a) a board body having an upper portion and a lower portion, being provided with a viewing window thereon;
   (b) an adjustable disc having a hollow body frame rotatably secured to said board body, a first lens being mounted to said body frame and corresponding to the viewing window; and (c) a second lens being mounted to one lateral side of the board body and covering the viewing window and corresponding to said first lens; whereby rotating the adjustable disc causes a variation of the polarized angle formed by the first and second lenses and thus changes the light transmittancy of the first and the second lenses;

wherein a ring slot is mounted at a circumferential edge of a first lateral side of the viewing window to retain and to allow the adjustable disc to rotate within the slot; and wherein the upper portion of the board body is connected to a connection bar which is pivotally mounted at an opposite end thereof to a vehicle, whereby the board body can be freely flipped down, and a recess is provided to the ring slot to restrict and to hold an actuating bar for rotating said adjustable disc, and a pair of blocking arms are formed at the slot to restrict the movement of the actuating bar.

* * * * *